(12) United States Patent
Matsumoto

(10) Patent No.: US 7,579,983 B2
(45) Date of Patent: Aug. 25, 2009

(54) TERMINAL APPARATUS, CONTROL METHOD FOR TERMINAL APPARATUS, CONTROL PROGRAM FOR TERMINAL APPARATUS, AND COMPUTER READABLE STORAGE MEDIUM HAVING STORED THEREIN CONTROL PROGRAM FOR TERMINAL APPARATUS

(75) Inventor: Kazumi Matsumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/514,975

(22) Filed: Sep. 5, 2006

(65) Prior Publication Data

US 2007/0063891 A1    Mar. 22, 2007

(30) Foreign Application Priority Data

Sep. 6, 2005    (JP)    ............................. 2005-257558

(51) Int. Cl.
    *G01H 1/00*    (2006.01)
(52) U.S. Cl. ................................. 342/357.02
(58) Field of Classification Search ................ 455/12.1, 455/313, 255; 342/357.01–357.17
    See application file for complete search history.

(56) References Cited

U.S. PATENT DOCUMENTS

| 5,841,396 | A |   | 11/1998 | Krasner |                |
|-----------|---|---|---------|---------|----------------|
| 6,127,968 | A | * | 10/2000 | Lu      | ......... 342/357.03 |
| 6,240,276 | B1| * | 5/2001  | Camp, Jr. | .............. 455/71 |
| 6,327,471 | B1| * | 12/2001 | Song    | ............... 455/440 |
| 6,421,002 | B2| * | 7/2002  | Krasner | ............... 342/357.1 |
| 6,697,016 | B1| * | 2/2004  | Voor et al. | ......... 342/357.15 |
| 7,053,825 | B2| * | 5/2006  | Kato et al. | ......... 342/357.12 |
| 7,062,240 | B2| * | 6/2006  | Ballantyne et al. | ..... 455/182.1 |
| 7,155,183 | B2| * | 12/2006 | Abraham | ............. 455/192.1 |
| 2003/0068977 | A1| * | 4/2003 | King | ................ 455/12.1 |
| 2004/0142701 | A1| * | 7/2004 | Abraham | ............. 455/456.1 |
| 2004/0214538 | A1| * | 10/2004 | Ballantyne et al. | ....... 455/141 |

FOREIGN PATENT DOCUMENTS

JP    2005-526256 A    9/2005

* cited by examiner

*Primary Examiner*—Thomas H Tarcza
*Assistant Examiner*—Nga X Nguyen
(74) *Attorney, Agent, or Firm*—Global IP Counselors, LLP

(57) ABSTRACT

A terminal apparatus including: communication means; positioning means; and reference signal supplying means for supplying a reference signal to the communication means and the positioning means, wherein the communication means includes: synchronizing purpose signal generating means for generating a synchronizing purpose signal to achieve synchronization with a communication signal, by correcting the reference signal, and the positioning means includes: positioning side reference signal generating means for generating, based on the reference signal, a positioning side reference signal; correcting information obtaining means for obtaining from the communication means correcting information used when the synchronizing purpose signal is generated; frequency error information generating means for generating, based on the correcting information, frequency error information indicating a frequency error of the positioning side reference signal relative to the communication signal; estimated receiving frequency information generating; and so on.

6 Claims, 11 Drawing Sheets

F I G. 1
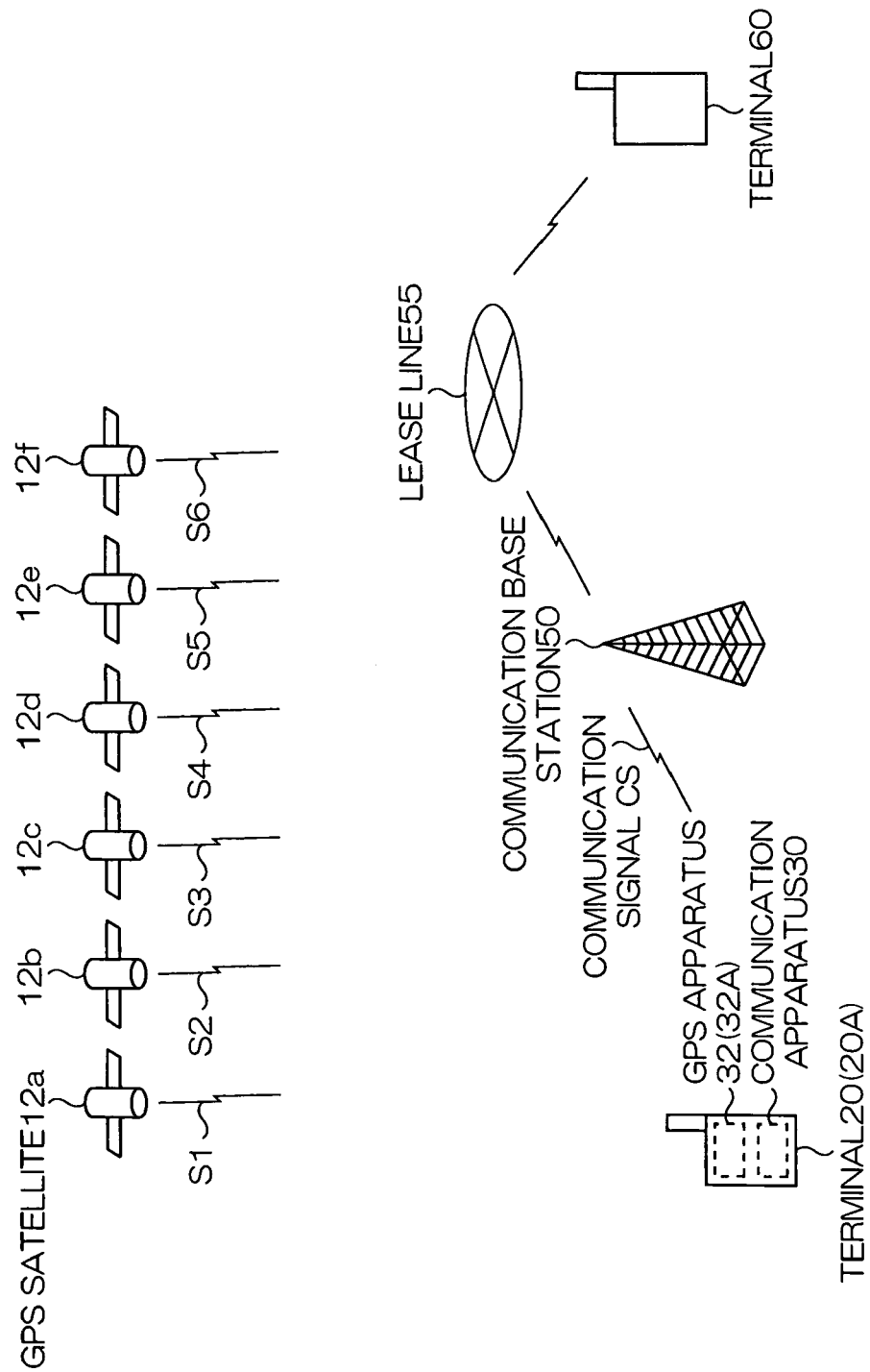

F I G.4

NCO SECTION30e
 FREQUENCY ADJUSTING METHOD :
  RANGE OF ±5kHz IS ADJUSTED BY 16bit(=65536 STEP)
  ↓
  1 STEP=0.15Hz(10kHz/65536)

NCO SETTING PARAMETER
  NC=0→100kHz
  NC=1000→100.15kHz(100kHz+0.15Hz×1000)

SATELLITE SEARCH FREQUENCY RANGE CALCULATING PROGRAM120

FORMULA 1 : $S - S \times G1 - S \times G2 \leq D \leq S + S \times G1 + S \times G2$ F I G.8
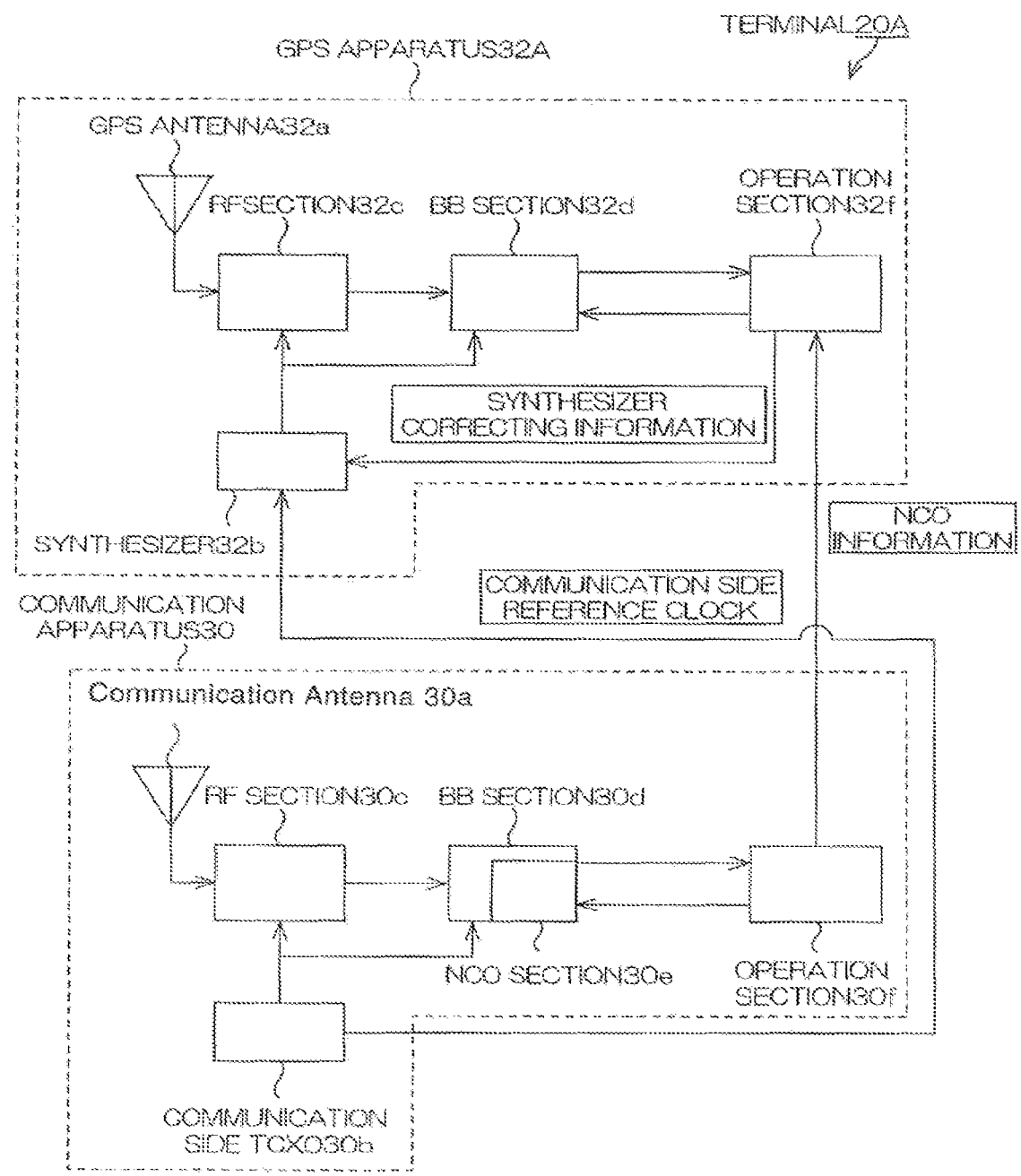

F I G. 9
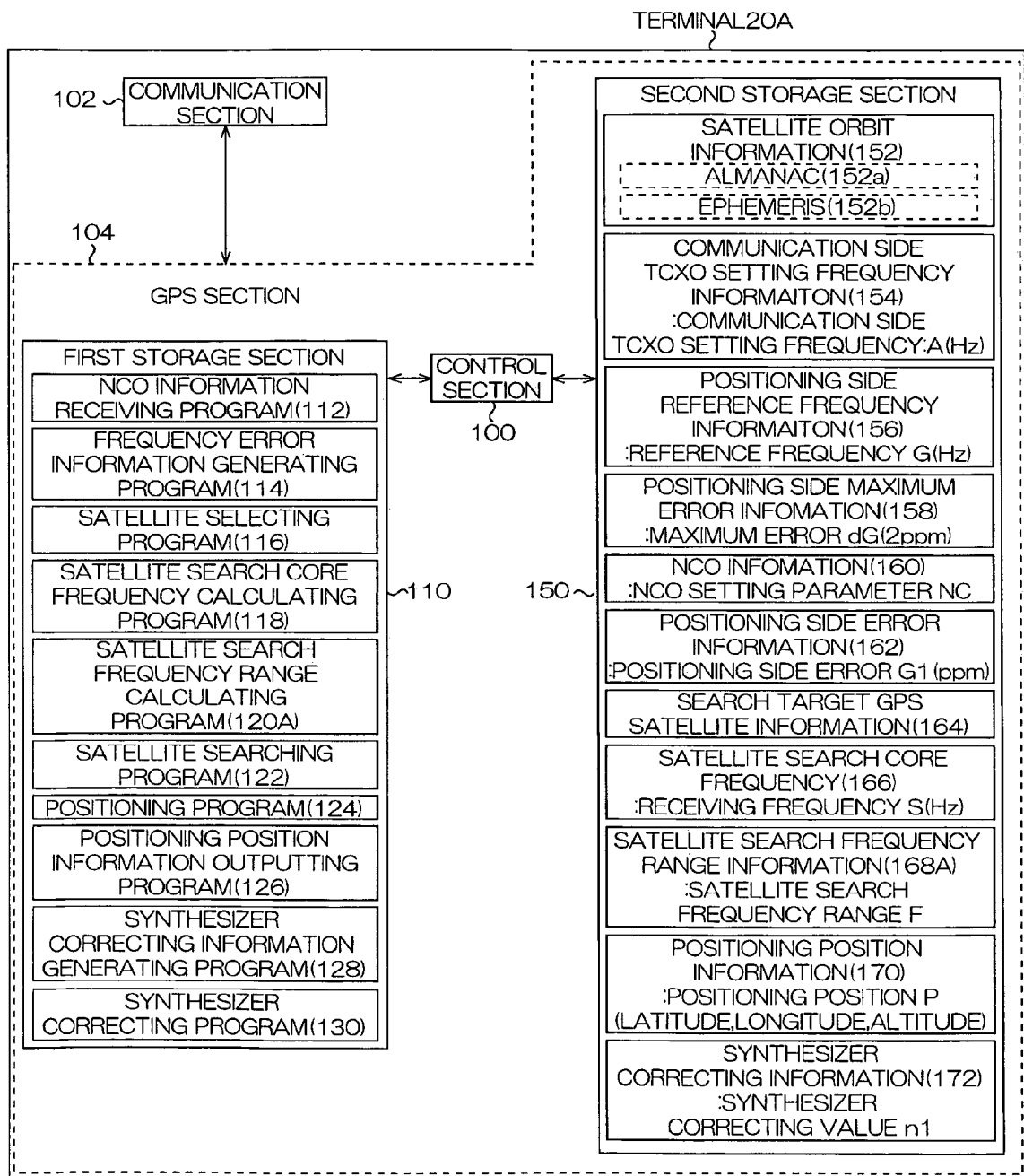

SYNTHESIZER CORRECTING INFORMATION GENERATING PROGRAM 128

FORMULA 2 : T×f(n)=G+A×G1

SATELLITE SEARCH FREQUENCY RANGE CALCULATING PROGRAM 120A

FORMULA 3 : S−S×G2≦F≦S+S×G2

TERMINAL APPARATUS, CONTROL METHOD FOR TERMINAL APPARATUS, CONTROL PROGRAM FOR TERMINAL APPARATUS, AND COMPUTER READABLE STORAGE MEDIUM HAVING STORED THEREIN CONTROL PROGRAM FOR TERMINAL APPARATUS

This application claims the priorities benefit under 35 U.S.C. § 119 of Japanese Patent Application No. 2005-257558 filed on Sep. 6, 2005, which is hereby incorporated in its entirety by reference.

BACKGROUND

1. Technical Field

The present invention relates to a terminal apparatus which uses a signal from a positioning satellite for positioning, a control method for the terminal apparatus, a control program for the terminal apparatus, and a computer readable storage medium having stored therein the control program for the terminal apparatus.

2. Related Art

A positioning system that positions the current position of a GPS receiver by using, for example, a GPS (Global Positioning System) which is a satellite navigation system has conventionally been put into practical use.

A GPS receiver, for example, selects four GPS satellites that are observable at the current time, predicts receiving frequencies from the respective GPS satellites, and receives signals from the respective GPS satellites. Based on the received signals, the GPS receiver determines the distance (hereinafter referred to as the "pseudo-range") between each GPS satellite and the GPS receiver by the difference (hereinafter referred to as the "delay time") between the time when a signal is transmitted from a GPS satellite and the time when the signal reaches the GPS receiver. Then, the GPS receiver calculates the position of each GPS satellite at the current time using orbit information (hereinafter referred to as the "ephemeris") on each GPS satellite and then performs a positioning operation on the current position using the respective orbital positions of the GPS satellites and the aforementioned pseudo-range. By the positioning operation, a positioning position in latitude, longitude, and altitude, for example, can be obtained.

In the aforementioned positioning using a GPS, when, taking into account the frequency error of a local oscillator of a GPS receiver, a wide receiving frequency range is set, the reception of signals from GPS satellites requires a long time.

In relation to this, there is proposed a technique which uses a feature that, in a terminal apparatus into which a mobile phone and a GPS receiver are integrally formed, the mobile phone is in synchronization with the carrier frequency of a communication wave from a base station (for example, U.S. Pat. No. 5,841,396). According to such a technique, when a mobile phone is in synchronization with the carrier frequency of a communication wave, by using a feature that the frequency of an output signal from a VCO (Voltage Controlled Oscillator), for example, which is a local oscillator that generates a reference signal (or a reference clock) of the mobile phone has accuracy that conforms to the carrier frequency of the communication wave, the frequency error of the reference signal (or reference clock) which is reference for the operation of a GPS receiver can be calculated and then the frequency error of the local oscillator of the GPS receiver can be corrected.

However, in a method of achieving synchronization with the carrier frequency of a communication wave by using, as a reference oscillator which generates a reference clock of a mobile phone, a TCXO (Temperature Compensated X'tal Oscillator) having stable accuracy, for example, and by using, as a digital oscillator, an NCO (Numerical Controlled Oscillator), for example, the aforementioned technique cannot be used in this method because the frequency of the reference oscillator is not corrected.

SUMMARY

Therefore, an advantage of some aspects of the invention is to provide a terminal apparatus capable of obtaining information indicating the frequency error of a reference signal of a positioning apparatus without correcting the frequency of a reference oscillator of a communication apparatus, a control method for the terminal apparatus, a control program for the terminal apparatus, and a computer readable storage medium having stored therein the control program for the terminal apparatus.

The aforementioned advantage is achieved by a terminal apparatus according to a first aspect of the invention. The terminal apparatus comprises: a communication means; positioning means; and reference signal supplying means for supplying a reference signal to the communication means and the positioning means. The communication means includes synchronizing purpose signal generating means for generating a synchronizing purpose signal to achieve synchronization with a communication signal from a communication base station, by correcting the reference signal. The positioning means includes: positioning side reference signal generating means for generating, based on the reference signal, a positioning side reference signal which is reference for an operation of the positioning means; correcting information obtaining means for obtaining from the communication means correcting information used when the synchronizing purpose signal is generated by correcting the reference signal; frequency error information generating means for generating, based on the correcting information, frequency error information indicating a frequency error of the positioning side reference signal relative to the communication signal; estimated receiving frequency information generating means for generating estimated receiving frequency information indicating an estimated receiving frequency, by estimating a receiving frequency of a satellite signal which is a signal from a positioning satellite; search frequency range information generating means for generating, based on the estimated receiving frequency information and the frequency error information, search frequency range information indicating a frequency range used for searching for the satellite signal; and satellite signal receiving means for receiving the satellite signal by searching for the frequency range indicated in the search frequency range information.

According to the first aspect of the invention, the positioning means of the terminal apparatus can obtain the correcting information.

The positioning means includes the frequency error information generating means and thus can generate, based on the correcting information, frequency error information indicating the frequency error of the positioning side reference signal relative to the communication signal.

Here, the correcting information is information for generating the synchronizing purpose signal by correcting the reference signal. Thus, based on the correcting information, the frequency error of the reference signal relative to the communication signal can be calculated.

On the other hand, since the positioning side reference signal is generated based on the reference signal, the frequency error of the reference signal relative to the communication signal indirectly indicates the frequency error of the positioning side reference signal relative to the communication signal.

Hence, the positioning means can generate, based on the correcting information, frequency error information indicating the frequency error of the positioning side reference signal relative to the communication signal.

By this, the terminal apparatus can obtain information indicating the frequency error of a reference signal of the positioning means without correcting the frequency of a reference oscillator of the communication means.

Furthermore, the positioning means includes the search frequency information generating means and thus can not only generate the estimated receiving frequency information but also generate the search frequency range information based on the frequency error information.

Here, the frequency range indicated in the frequency error information is normally narrower than the maximum error range of the positioning side reference signal.

Thus, by using the frequency error information to generate the search frequency range information, it is possible to narrow down the frequency range which is indicated in the search frequency range information, as compared with the case of using information indicating the maximum error of the positioning side reference signal.

By this, without correcting the positioning side reference signal, it is possible to reduce the time required for the terminal apparatus to receive the satellite signal.

In the first aspect of the invention, it is preferable that the positioning means further include: positioning side reference signal correcting information generating means for generating, based on the frequency error information, positioning side reference signal correcting information for correcting a frequency error of the positioning side reference signal generating means relative to the communication signal; and frequency error correcting means for correcting, based on the positioning side reference signal correcting information, the frequency error of the positioning side reference signal generating means relative to the communication signal.

According to the above-described configuration, the positioning means of the terminal apparatus can generate the positioning side reference signal correcting information by using the positioning side reference signal correcting information generating means, and can correct the frequency error of the positioning side reference signal generating means relative to the communication signal by using the frequency error correcting means.

The aforementioned advantage is achieved by a control method for a terminal apparatus having communication means, positioning means, and reference signal supplying means for supplying a reference signal to the communication means and the positioning means, according to a second aspect of the invention. The method comprises: generating, by the terminal apparatus, a synchronizing purpose signal to achieve synchronization with a communication signal from a communication base station, by correcting the reference signal in the communication means; obtaining, by the terminal apparatus, correcting information from the communication means, the correcting information being used when the synchronizing purpose signal is generated by correcting the reference signal; generating, based on the correcting information, frequency error information indicating a frequency error of a positioning side reference signal relative to the communication signal, the positioning side reference signal being generated based on the reference signal and being reference for an operation of the positioning means; generating, by the terminal apparatus, estimated receiving frequency information indicating an estimated receiving frequency, by estimating a receiving frequency of a satellite signal which is a signal from a positioning satellite; generating, by the terminal apparatus, search frequency range information indicating a frequency range used for searching for the satellite signal, based on the estimated receiving frequency information and the frequency error information; and receiving, by the terminal apparatus, the satellite signal by searching for the frequency range indicated in the search frequency range information.

According to the second aspect of the invention, as with the first aspect of the invention, the terminal apparatus can obtain information indicating the frequency error of a reference signal of the positioning means, without correcting the frequency of a reference oscillator of the communication means.

In addition, without correcting the positioning side reference signal, it is possible to reduce the time required for the terminal apparatus to receive the satellite signal.

The aforementioned advantage is achieved by a control program for a terminal apparatus having communication means, positioning means, and reference signal supplying means for supplying a reference signal to the communication means and the positioning means, according to a third aspect of the invention. The program causes a computer to perform the steps of: generating, by the terminal apparatus, a synchronizing purpose signal to achieve synchronization with a communication signal from a communication base station, by correcting the reference signal in the communication means; obtaining, by the terminal apparatus, correcting information from the communication means, the correcting information being used when the synchronizing purpose signal is generated by correcting the reference signal; generating, based on the correcting information, frequency error information indicating a frequency error of a positioning side reference signal relative to the communication signal, the positioning side reference signal being generated based on the reference signal and being reference for an operation of the positioning means; generating, by the terminal apparatus, estimated receiving frequency information indicating an estimated receiving frequency, by estimating a receiving frequency of a satellite signal which is a signal from a positioning satellite; generating, by the terminal apparatus, search frequency range information indicating a frequency range used for searching for the satellite signal, based on the estimated receiving frequency information and the frequency error information; and receiving, by the terminal apparatus, the satellite signal by searching for the frequency range indicated in the search frequency range information.

The aforementioned advantage is achieved by a computer readable storage medium having stored therein a control program for a terminal apparatus having communication means, positioning means, and reference signal supplying means for supplying a reference signal to the communication means and the positioning means, according to a fourth aspect of the invention. The program causes a computer to perform the steps of: generating, by the terminal apparatus, a synchronizing purpose signal to achieve synchronization with a communication signal from a communication base station, by correcting the reference signal in the communication means; obtaining, by the terminal apparatus, correcting information from the communication means, the correcting information being used when the synchronizing purpose signal is generated by correcting the reference signal; generating, based on the correcting information, frequency error information indicating a frequency error of a positioning side reference signal relative to the communication signal, the positioning side reference signal being generated based on the reference signal and being reference for an operation of the positioning means; generating, by the terminal apparatus, estimated receiving frequency information indicating an estimated receiving frequency, by estimating a receiving frequency of a satellite signal which is a signal from a positioning satellite; generating, by the terminal apparatus, search frequency range information indicating a frequency range used for searching for the satellite signal, based on the estimated receiving frequency information and the frequency error information; and receiving, by the terminal apparatus, the satellite signal by searching for the frequency range indicated in the search frequency range information.

BRIEF DESCRIPTION OF THE DRAWINGS

The invention will be described with reference to the accompanying drawings, wherein like numbers reference like elements.

FIG. 1 is a schematic diagram showing a terminal and the like according to an embodiment of the invention.

FIG. 4 is an illustrative diagram of an NCO.

FIG. 8 is a schematic block diagram showing the main part of a terminal.

FIG. 9 is a schematic diagram showing the main software configuration of the terminal.

DESCRIPTION OF EXEMPLARY EMBODIMENTS

Figure 2:
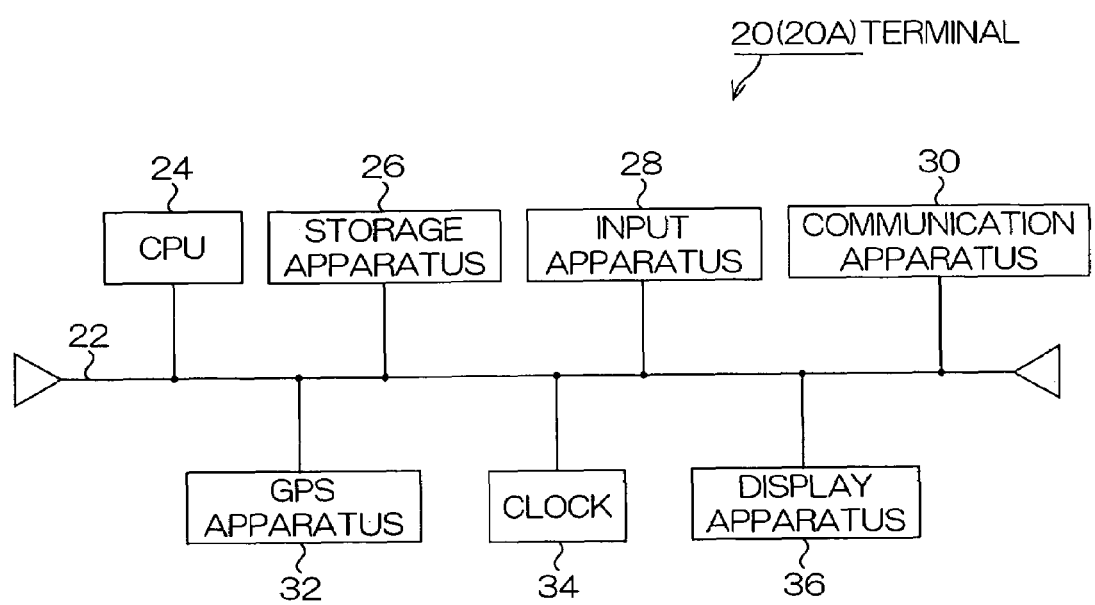
FIG. 2 is a schematic diagram showing the main hardware configuration of the terminal.

Hereinafter, with reference to the drawings, the exemplary embodiment(s) of this invention will be described in detail.

The following embodiments are given various limitations that are technically preferable because they are the exemplary specific examples of the invention, however, the scope of the invention is not limited to these aspects unless there is a particular description to limit the invention in the following descriptions.

First Embodiment

FIG. 1 is a schematic diagram showing a terminal 20 and the like according to a first embodiment of the invention.

As shown in FIG. 1, the terminal 20 includes a communication apparatus 30 and is capable of communicating with another terminal 60 or the like through a communication base station 50 and a lease line 55. The terminal 20 is an exemplary terminal apparatus and the communication apparatus 30 is an exemplary communication means.

In addition, the terminal 20 includes a GPS apparatus 32 and is capable of receiving signals S1, S2, S3, S4, S5, and S6 from GPS satellites 12a, 12b, 12c, 12d, 12e, and 12f, and thereby positioning the current position. The GPS satellites 12a, etc., are exemplary positioning satellites and the signals S1, etc., are exemplary satellite signals. The GPS apparatus 32 is an exemplary positioning means.

Examples of the terminal 20 include a mobile phone, a PHS (Personal Handy-phone System), a PDA (Personal Digital Assistance), and the like; the terminal 20 is not limited thereto.

Note that, unlike the present embodiment, the GPS satellites 12a, etc., may be between three and five in number or may be seven or more in number.

Main Hardware Configuration of Terminal 20

FIG. 2 is a schematic diagram showing the main hardware configuration of the terminal 20.

As shown in FIG. 2, the terminal 20 has a computer and the computer has a bus 22.

To the bus 22 are connected a CPU (Central Processing Unit) 24, a storage apparatus 26, and the like. The storage apparatus 26 is, for example, a RAM (Random Access Memory), a ROM (Read Only Memory), or the like.

In addition, to the bus 22 are connected an input apparatus 28 used to input various information, the communication apparatus 30, and the GPS apparatus 32.

Furthermore, to the bus 22 are connected a clock 34 used to measure a time and a time period and a display apparatus 36 that displays various information.

Figure 3:
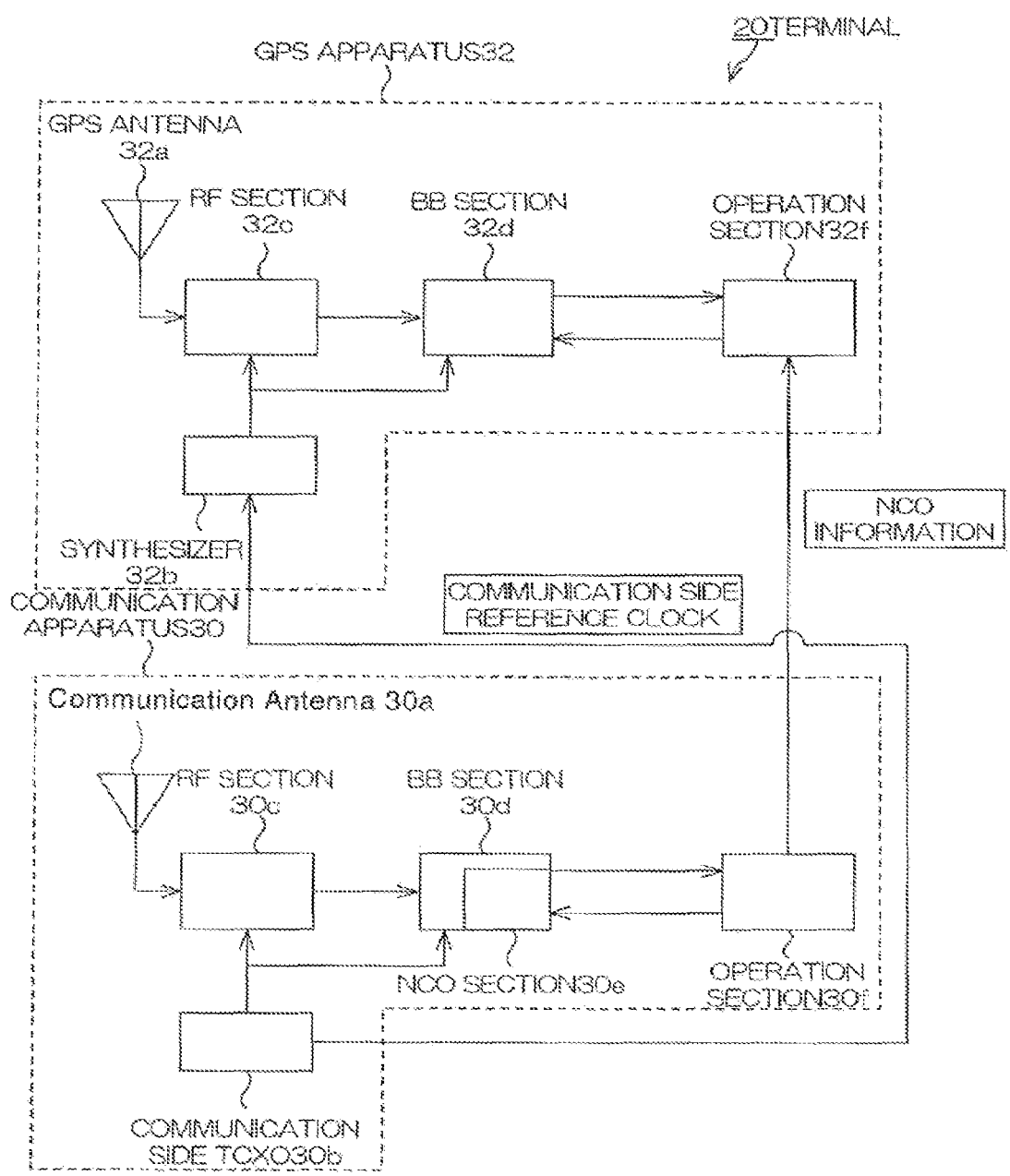
FIG. 3 is a schematic block diagram showing the main part of the terminal.

FIG. 3 is a schematic block diagram showing the main part of the terminal 20.

As shown in FIG. 3, the GPS apparatus 32 includes a GPS antenna 32a, a synthesizer 32b, an RF (Radio Frequency) section 32c, and a BB (Base Band) section 32d. The synthesizer 32b is a signal synthesizing apparatus that receives a communication side reference clock to be generated by a communication side TCXO 30b (see FIG. 3) which will be described later, and then generates, based on the communication side reference clock, a reference clock (hereinafter referred to as the "positioning side reference clock") for the operation of the GPS apparatus 32. The communication side reference clock is an exemplary reference signal. The positioning side reference clock is an exemplary positioning side reference signal and the synthesizer 32b is an exemplary positioning side reference signal generating means. The BB section 32d sends and receives data to/from a CPU (also called "operation section") 32f.

As shown in FIG. 3, the communication apparatus 30 includes a communication antenna 30a, the communication side TCXO 30b, an RF section 30c, a BB section 30d, and an NCO section 30e.

The communication side TCXO 30b is an oscillator that generates a communication side reference clock which is reference for the operation of the communication apparatus 30. The communication side reference clock is an exemplary reference signal and the communication side TCXO 30b is an exemplary reference signal supplying means.

The communication side TCXO 30b can generate a highly accurate frequency with a frequency error of 0.3 ppm, for example, but is not configured to correct the frequency error.

The NCO section 30e generates, based on the communication side reference clock, an NCO signal to digitally achieve synchronization with a communication signal CS from the communication base station 50. The NCO signal is an exemplary synchronizing purpose signal and the NCO section 30e is an exemplary synchronizing purpose signal generating means.

When the communication apparatus 30 receives a communication signal CS, the communication apparatus 30, for example, downconverts the frequency of the communication signal CS in the RF section 30c and furthermore converts the communication signal CS into a digital signal and sends the digital signal to the BB section 30d. The NCO section 30e corrects the communication side reference clock and thereby generates an NCO signal which can achieve synchronization with the digital signal received by the BB section 30d. In other words, the NCO section 30e corrects the communication side reference clock and thereby generates an NCO signal so as to be equal to the frequency of the digital signal received by the BB section 30d. Since the NCO signal is in synchronization with the communication signal CS, the accuracy of the frequency of the NCO signal is equal to that of the communication signal CS.

FIG. 4 is an illustrative diagram of the NCO section 30e.

As shown in FIG. 4, the NCO section 30e is configured to adjust, for example, a frequency in the range of (±) 5 kHz by 16 bits, i.e., 65536 steps. In this case, by one step, a frequency of 0.15 Hz can be adjusted.

The NCO section 30e corrects the communication side reference clock according to an NCO setting parameter NC. For example, when an output signal from the NCO section 30e is 100 kHz with the NCO setting parameter NC being 0, the output signal becomes 100.15 kHz by setting the NCO setting parameter NC to 1000.

The NCO section 30e sends the NCO setting parameter NC to an operation section 30f. The operation section 30f then sends the NCO setting parameter NC to the operation section 32f of the GPS apparatus 32.

Note that a communication side reference clock which is generated by the communication side TCXO 30b is not corrected. That is, the communication side TCXO 30b is a free-running component and thus a control signal such as an NCO signal is not fed back to the communication side TCXO 30b. Therefore, a control circuit for the communication side TCXO 30b is not required, thus providing advantages such as a reduction in the total cost of the terminal 20 and easy replacement of the communication side TCXO 30b with another oscillator.

Main Software Configuration of Terminal 20

Figure 5:
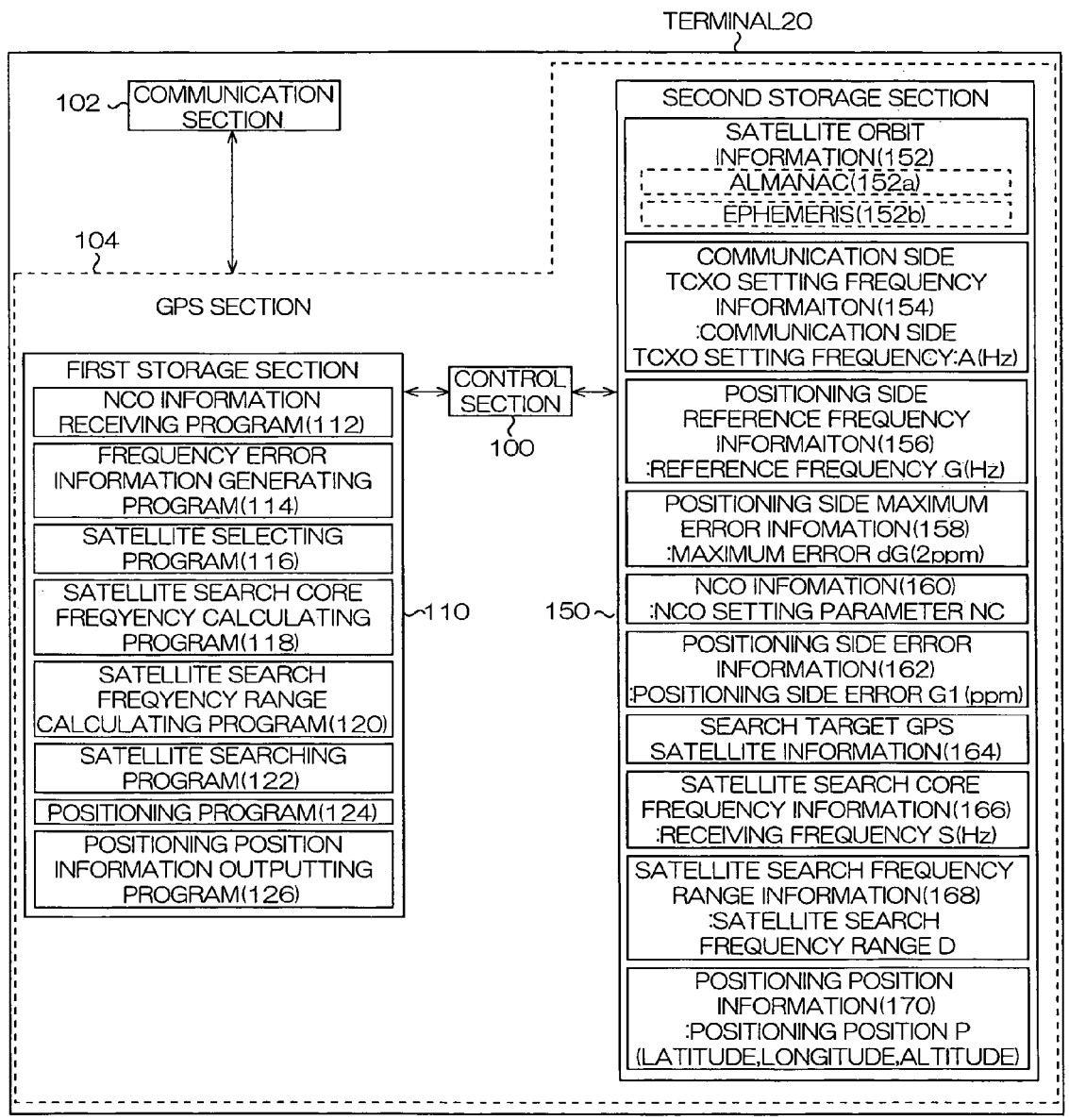
FIG. 5 is a schematic diagram showing the main software configuration of the terminal.

FIG. 5 is a schematic diagram showing the main software configuration of the terminal 20.

As shown in FIG. 5, the terminal 20 has a communication section 102 which corresponds to the communication apparatus 30 of FIG. 2 and a GPS section 104 which corresponds to the GPS apparatus 32 of FIG. 2.

The GPS section 104 has a first storage section 110 where various programs are stored and a second storage section 150 where various information is stored.

As shown in FIG. 5, in the second storage section 150 of the GPS section 104, satellite orbit information 152 is stored. The satellite orbit information 152 includes an almanac 152a and an ephemeris 152b.

The almanac 152a is information indicating rough orbits of all the GPS satellites 12a, etc. (see FIG. 1). The almanac 152a can be obtained from any of the signals S1, etc., from the GPS satellites 12a, etc., by decoding the signal.

The ephemeris 152b is information indicating precise orbits of the GPS satellites 12a, etc. (see FIG. 1). For example, to obtain the ephemeris 152b of the GPS satellite 12a, there is a need to receive the signal S1 from the GPS satellite 12a and then decode the signal S1.

As shown in FIG. 5, in the second storage section 150 of the GPS section 104, is stored communication side TCXO setting frequency information 154 indicating a communication side TCXO setting frequency A (Hz) which is a communication side reference clock setting frequency.

As shown in FIG. 5, in the second storage section 150 of the GPS section 104, is stored positioning side reference frequency information 156 indicating a reference frequency G (Hz) of a positioning side reference clock which is generated by the synthesizer 32b. The reference frequency G is a nominal value (or setting value) of a frequency to be generated by the synthesizer 32b.

In addition, the terminal 20 stores, in the second storage section 150, positioning side maximum error information 158 indicating a maximum error dG which is the maximum value of the frequency error of the positioning side reference clock.

As shown in FIG. 5, in the first storage section 110 of the GPS section 104, an NCO information receiving program 112 is stored. The NCO information receiving program 112 is a program for a control section 100 to obtain from the communication section 102 NCO information 160 indicating an NCO setting parameter NC used when an NCO signal is generated by correcting a communication side reference clock. That is, the NCO information receiving program 112 and the control section 100 is an exemplary correcting information obtaining means.

The control section 100 stores the obtained NCO information 160 in the second storage section 150.

As shown in FIG. 5, in the first storage section 110 of the GPS section 104, a frequency error information generating program 114 is stored. The frequency error information generating program 114 is a program for the control section 100 to generate, based on the NCO information 160, positioning side error information 162 indicating a positioning side error G1 (hereinafter also referred to as the "error G1") which is the frequency error of the positioning side reference clock relative to the communication signal CS (see FIG. 1). The positioning side error information 162 is an exemplary frequency error information. The frequency error information generating program 114 and the control section 100 is an exemplary frequency error information generating means.

Since the NCO setting parameter NC is a setting value used for correcting the communication side reference clock to generate an NCO signal to achieve synchronization with a downconverted communication signal CS, the NCO setting parameter NC supports the frequency error of the communication side reference clock relative to the communication signal CS.

Here, since the positioning side reference clock is generated based on the communication side reference clock which is generated by the communication side TCXO 30b, the NCO setting parameter NC is also information which indirectly indicates the frequency error of the positioning side reference clock relative to the communication signal CS.

Thus, the control section 100 converts the NCO setting parameter NC indicated in the NCO information 160 into a frequency and divides the frequency by a communication side TCXO setting frequency A, thereby calculating a frequency ratio Gn (ppm) (not shown) which is adjusted by the NCO section 30e. The frequency ratio Gn is also information indicating the frequency error of the positioning side reference clock relative to the communication signal CS.

Hence, by reversing the plus and minus (±) signs of the frequency ratio Gn, the positioning side error G1 (ppm) of the positioning side reference clock relative to the communication signal CS can be calculated. For example, when the frequency ratio Gn is plus (+) 0.2 ppm, the positioning side error G1 is minus (−) 0.2 ppm.

As shown in FIG. 5, in the first storage section 110 of the GPS section 104, a satellite selecting program 116 is stored. The satellite selecting program 116 is a program for selecting observable GPS satellites 12a, etc., using the rough position of the terminal 20 and the almanac 152a, and then generating search target GPS satellite information 164 indicating the selected GPS satellites 12a, etc.

For example, the control section 100 selects the GPS satellites 12a, 12b, 12c, and 12d (see FIG. 1).

For the rough position of the terminal 20, for example, a positioning position P indicated in positioning position information 170 (see FIG. 5) which is generated upon the last positioning and will be described later can be used.

The control section 100 stores, in the second storage section 150, the search target GPS satellite information 164 indicating the selected GPS satellites 12a, etc.

As shown in FIG. 5, in the first storage section 110 of the GPS section 104, a satellite search core frequency calculating program 118 is stored. The satellite search core frequency calculating program 118 is a program for the control section 100 to estimate receiving frequencies S of signals S1, etc., from the GPS satellites 12a, etc., which are selected by the satellite selecting program 116, and then generate satellite search core frequency information 166 indicating the receiving frequencies S. The satellite search core frequency information 166 is exemplary estimated receiving frequency information. The satellite search core frequency calculating program 118 and the control section 100 is an exemplary estimated receiving frequency information generating means.

For example, the GPS section 104 calculates a Doppler shift of the signals S1, etc., from the GPS satellites 12a, etc., using the rough position of the terminal 20 and the ephemeris 152b, and then calculates receiving frequencies S of the signals S1, etc., based on the transmission frequencies of the signals S1, etc., and the Doppler shift.

The control section 100 stores the generated satellite search core frequency information 166 in the second storage section 150.

As shown in FIG. 5, in the first storage section 110 of the GPS section 104, a satellite search frequency range calculating program 120 is stored. The satellite search frequency range calculating program 120 is a program for the control section 100 to generate, based on the satellite search core frequency information 166, satellite search frequency range information 168 indicating a satellite search frequency range D which is a frequency range used for searching for the signals S1, etc., from the GPS satellites 12a, etc., which are selected by the satellite selecting program 116. The satellite search frequency range information 168 is an exemplary search frequency range information. The satellite search frequency range calculating program 120 and the control section 100 is an exemplary search frequency range information generating means.

Figure 6:
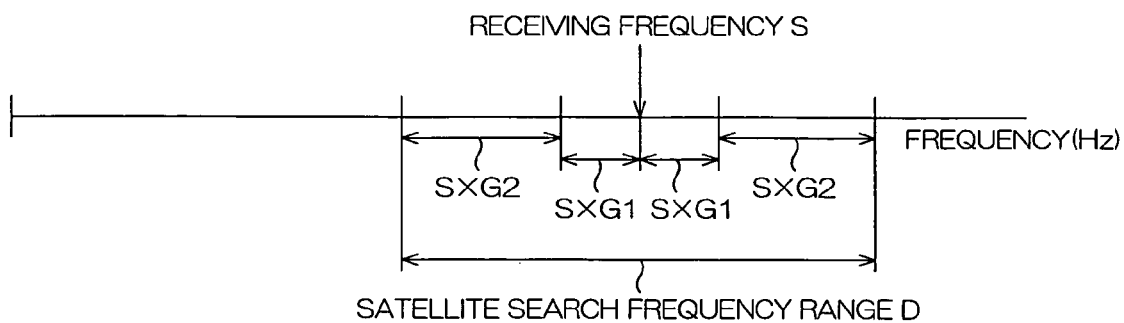
FIG. 6 is an illustrative diagram of a satellite search frequency range calculating program.

FIG. 6 is an illustrative diagram of the satellite search frequency range calculating program 120.

As shown in FIG. 6, the control section 100 calculates, as the satellite search frequency range D, a range in which a frequency range is extended by a positioning side error G1 and a safety factor (margin) G2 with a receiving frequency S being the core (center).

Specifically, the control section 100 generates satellite search frequency range information 168 indicating the satellite search frequency range D which is defined by the formula 1 of $S-S\times G1-S\times G2 \leq D \leq S+S\times G1+S\times G2$.

The control section 100 stores the generated satellite search frequency range information 168 in the second storage section 150.

As shown in FIG. 5, in the first storage section 110 of the GPS section 104, a satellite searching program 122 is stored. The satellite searching program 122 is a program for the control section 100 to search for the satellite search frequency range D indicated in the satellite search frequency range information 168 and receive the signals S1, etc. That is, the satellite searching program 122 and the control section 100 is an exemplary satellite signal receiving means.

As shown in FIG. 5, in the first storage section 110 of the GPS section 104, a positioning calculating program 124 is stored. The positioning calculating program 124 is a program for the control section 100 to generate, based on the received signals S1, etc., positioning position information 170 indicating a positioning position P. The positioning position P is information indicating the current position of the terminal 20 in terms of latitude, longitude, and altitude, for example.

The control section 100 receives signals S1, etc., from three or more GPS satellites 12a, etc., and determines a pseudo-range which is a distance between each of the GPS satellites 12a, etc., and the terminal 20, by a delay time which is a difference between the time when each of the signals S1, etc., is transmitted from the respective GPS satellites 12a, etc., and the time when each of the signals reaches the terminal 20. Then, the control section 100 performs a positioning operation on the current position using the ephemeris 152b and the aforementioned pseudo-range.

The control section 100 stores the generated positioning position information 170 in the second storage section 150.

As shown in FIG. 5, in the first storage section 110 of the GPS section 104, a positioning position information outputting program 126 is stored. The positioning position information outputting program 126 is a program for the control section 100 to display the positioning position information 170 on the display apparatus 36 (see FIG. 2).

The terminal 20 is configured as described above.

As described above, the GPS apparatus 32 of the terminal 20 can obtain NCO information 160 from the communication apparatus 30.

Then, the GPS apparatus 32 can generate positioning side error information 162 based on the NCO information 160. The NCO information 160 is information for generating a synchronizing purpose signal to achieve synchronization with the communication signal CS, by correcting the communication side reference clock.

Since the positioning side reference clock is generated based on the communication side reference clock, the frequency error of the communication side reference clock relative to the communication signal CS indirectly indicates the frequency error of the positioning side reference clock relative to the communication signal CS. Accordingly, the terminal 20 can generate, based on the NCO information 160, positioning side error information 162 indicating the frequency error of the positioning side reference clock relative to the communication signal CS.

By this, the terminal 20 can obtain information indicating the frequency error of the reference signal of the GPS apparatus 32, without correcting the frequency of a reference oscillator of the communication apparatus 30.

Furthermore, the terminal 20 can not only generate the satellite search core frequency information 166 (see FIG. 5) but also generate the satellite search frequency range information 168 (see FIG. 5) based on the positioning side error information 162.

Here, the positioning side error G1 indicated in the positioning side error information 162 is normally smaller than the maximum error dG indicated in the positioning side maximum error information 158. For example, while the maximum error dG is 2.0 ppm, the positioning side error G1 is 0.1 ppm.

Thus, by using the positioning side error information 162 to generate the satellite search frequency range information 168, it is possible to narrow down the frequency range which is indicated in the satellite search frequency range information 168, as compared with the case of using the positioning side maximum error information 158.

By this, without correcting the frequency error of the positioning side reference clock, it is possible to reduce the time required for the GPS apparatus 32 to receive the signals S1, etc., from the GPS satellites 12a, etc.

The configuration of the terminal 20 according to the present embodiment is described above. An exemplary operation of the terminal 20 will be described below using mainly FIG. 7.

Figure 7:
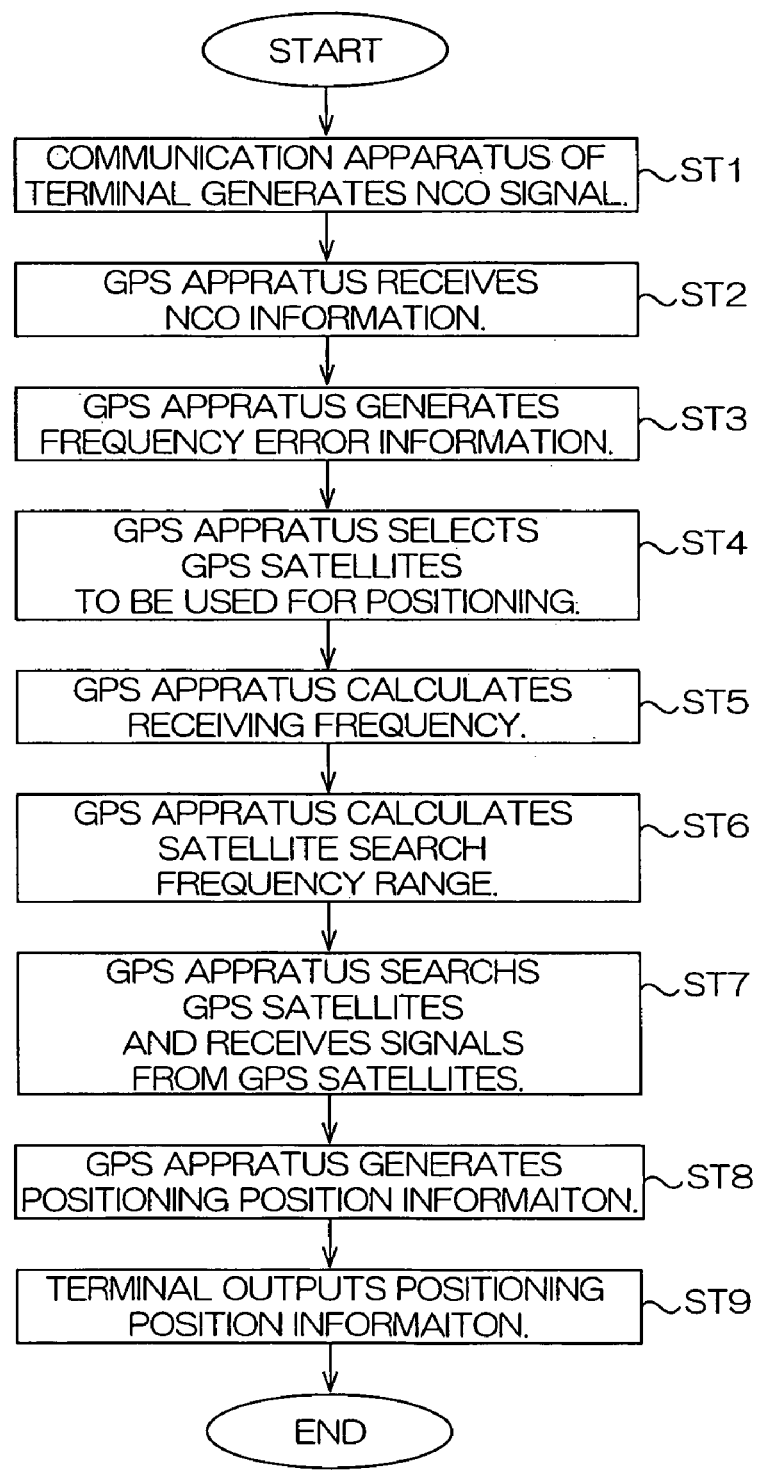
FIG. 7 is a schematic flowchart showing an exemplary operation of the terminal.

FIG. 7 is a schematic flowchart showing an exemplary operation of the terminal 20.

First, the communication apparatus 30 of the terminal 20 generates an NCO signal (step ST1 in FIG. 7). The step ST1 is an exemplary step of generating a synchronizing purpose signal.

Subsequently, the GPS apparatus 32 of the terminal 20 receives NCO information 160 (see FIG. 5) (step ST2). The step ST2 is an exemplary step of obtaining correcting information.

The GPS apparatus 32 generates positioning side error information 162 (see FIG. 5) (step ST3). The step ST3 is an exemplary step of generating frequency error information.

The GPS apparatus 32 then selects GPS satellites 12a, etc., to be used for positioning (step ST4).

The GPS apparatus 32 calculates a receiving frequency S (see FIG. 5) (step ST5). The step ST5 is an exemplary step of generating estimated receiving frequency information.

The terminal 20 calculates a satellite search frequency range D (see FIG. 5) (step ST6). The step ST6 is an exemplary step of generating search frequency range information.

The GPS apparatus 32 receives signals S1, etc., from the GPS satellites 12a, etc. (step ST7). The step ST7 is an exemplary step of receiving a satellite signal.

The GPS apparatus 32 generates positioning position information 170 (see FIG. 5) (step ST8).

The GPS apparatus 32 then outputs the positioning position information 170 (step ST9).

By the aforementioned steps, the terminal 20 can obtain information indicating the frequency error of a reference signal of the GPS apparatus 32, without correcting the frequency of a reference oscillator of the communication apparatus 30. In addition, without correcting the frequency error of a positioning side reference clock, it is possible to reduce the time required for the terminal 20 to receive the signals S1, etc., from the GPS satellites 12a, etc.

Second Embodiment

Now, a terminal 20A (see FIG. 1) according to a second embodiment will be described.

Most of the configuration of the terminal 20A according to the second embodiment is identical to the configuration of the terminal 20 according to the first embodiment, and therefore, identical parts are denoted by the same reference numerals and the description thereof is omitted. Hereinafter, differences are mainly described.

The terminal 20A is, unlike the terminal 20, configured to correct the frequency error of a synthesizer 32b (see FIG. 8) relative to a communication signal CS, on the basis of information which is based on NCO information 160.

FIG. 8 is a schematic block diagram showing the main part of the terminal 20A.

As shown in FIG. 8, an operation section 32f of a GPS apparatus 32A sends to the synthesizer 32b synthesizer correcting information 172 which will be described later.

FIG. 9 is a schematic diagram showing the main software configuration of the terminal 20A.

As shown in FIG. 9, the terminal 20A stores in a first storage section 110 a synthesizer correcting information generating program 128. The synthesizer correcting information generating program 128 is a program for a control section 100 to generate, based on positioning side error information 162, synthesizer correcting information 172 for correcting a positioning side error G1. The synthesizer correcting information 172 is an exemplary positioning side reference signal correcting information. The synthesizer correcting information generating program 128 and the control section 100 is an exemplary positioning side reference signal correcting information generating means.

Figures 10, 11:
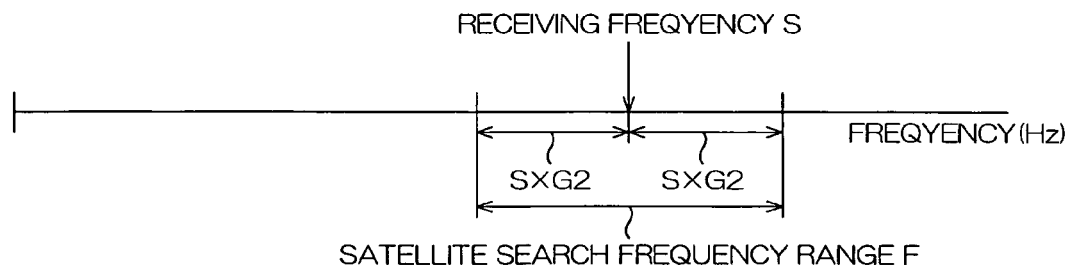
FIG. 10 is an illustrative diagram of a synthesizer correcting information generating program.
FIG. 11 is an illustrative diagram of a satellite search frequency range calculating program.

FIG. 10 is an illustrative diagram of the synthesizer correcting information generating program 128.

The synthesizer 32b generates a positioning side reference clock by multiplying a frequency T of a communication side reference clock by a function f(n). The function f(n) is also called the parameter of the synthesizer 32b.

The control section 100 calculates such a synthesizer correcting value n1 that obtains the equation of A×G1=0 in the formula 2 of T×f(n)=G+A×G1.

The control section 100 stores, in a second storage section 150, the synthesizer correcting information 172 indicating the synthesizer correcting value n1.

As shown in FIG. 9, in the first storage section 110 of a GPS section 104, a synthesizer correcting program 130 is stored. The synthesizer correcting program 130 is a program for the control section 100 to correct the frequency error of the positioning side reference clock based on the synthesizer correcting information 172. That is, the synthesizer correcting program 130 and the control section 100 is an exemplary positioning side reference signal correcting means.

Specifically, the control section 100 sets the synthesizer correcting value n1 to the parameter f(n) of the synthesizer 32b. Specifically, the control section 100 sets such that n=n1 in the parameter f(n).

By this, the positioning side reference clock which is generated by the synthesizer 32f has no difference from a reference frequency G.

As shown in FIG. 9, in the first storage section 110 of the GPS section 104, a satellite search frequency range calculating program 120A is stored. The satellite search frequency range calculating program 120A is a program for the control section 100 to generate, based on satellite search core frequency information 166 and a margin, satellite search frequency range information 168A indicating a satellite search frequency range F which is a frequency range used for searching for signals S1, etc. The satellite search frequency range information 168A is an exemplary search frequency range information. The satellite search frequency range calculating program 120A and the control section 100 is an exemplary search frequency range information generating means.

FIG. 11 is an illustrative diagram of the satellite search frequency range calculating program 120A.

As shown in FIG. 11, the control section 100 calculates, as a satellite search frequency range F, a range in which a frequency range is extended by a margin G2 with a receiving frequency S being the core.

Specifically, the control section 100 generates satellite search frequency range information 168A indicating the frequency range F which is defined by the formula 3 of S−S×G2≦F≦S+S×G2.

The control section 100 stores the generated satellite search frequency range information 168A in the second storage section 150.

The control section 100 receives signals S1, etc., by searching for the aforementioned satellite search frequency range F by using a satellite search program 122.

The terminal 20A is configured as described above.

As described above, the GPS apparatus 32A of the terminal 20A can generate synthesizer correcting information 172 (see FIG. 9). Then, the GPS apparatus 32A can correct the frequency error of the synthesizer 32b based on the synthesizer correcting information 172.

The GPS apparatus 32A can generate satellite search frequency range information 168A based on satellite search core frequency information 166 and a margin.

Here, since, as described above, the frequency error of a positioning side reference cock which is generated by the synthesizer 32b is corrected based on the synthesizer correcting information 172, the terminal 20A can generate satellite search frequency range information 168A with the frequency error of the positioning side reference clock being corrected.

Thus, since the satellite search frequency range information 168A can be generated without the frequency error of the GPS side reference clock, the frequency range F (see FIG. 11) which is indicated in the satellite search frequency range information 168A can be narrowed down.

By this, without correcting the frequency error of the positioning side reference clock, it is possible to further reduce the time required for the terminal 20A to receive the signals S1, etc., from the GPS satellites 12a, etc.

The configuration of the terminal 20A is described above. An exemplary operation of the terminal 20A will be described below using mainly FIG. 12.

Figure 12:
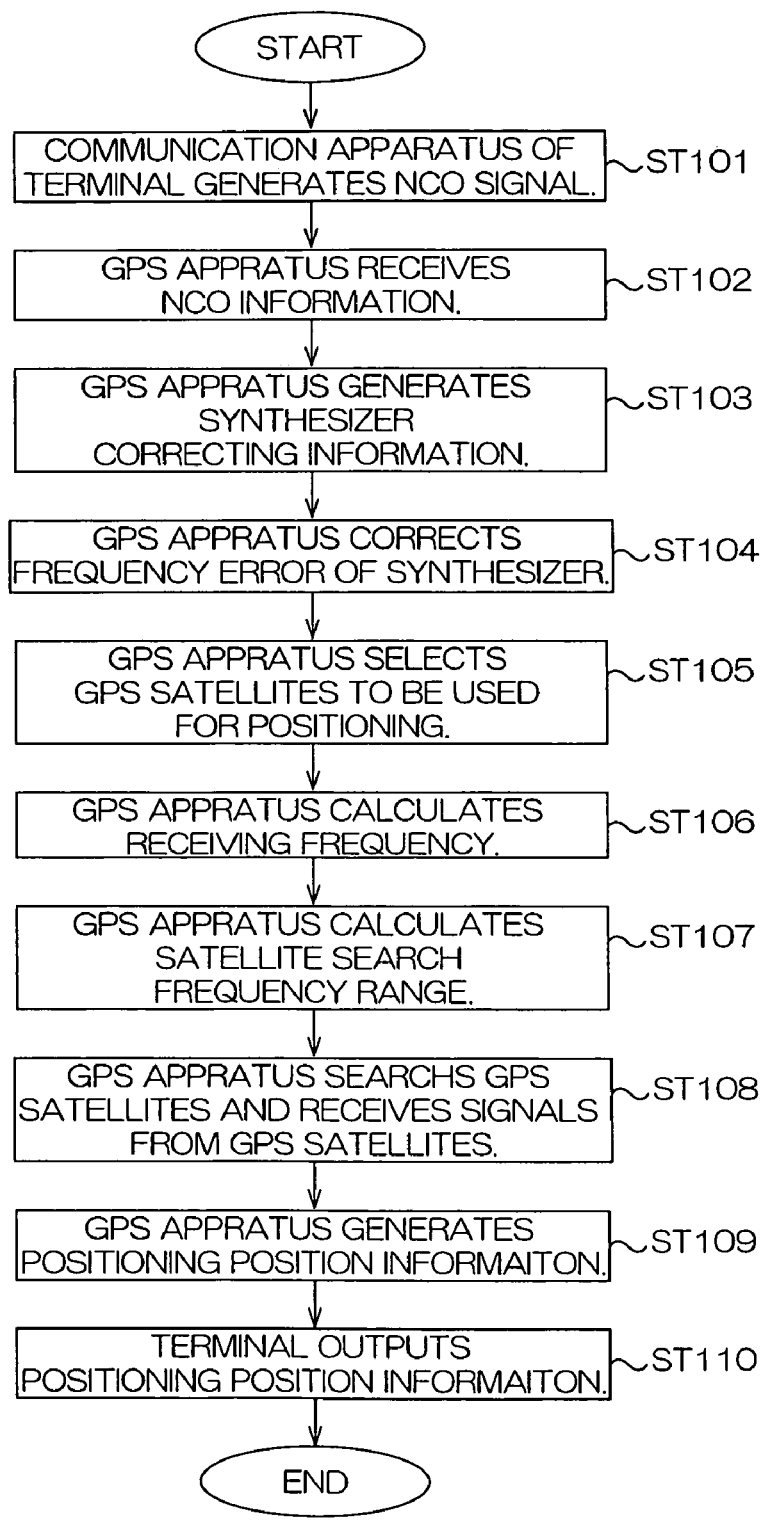
FIG. 12 is a schematic flowchart showing an exemplary operation of the terminal.

FIG. 12 is a schematic flowchart showing an exemplary operation of the terminal 20A.

First, the communication apparatus 30 of the terminal 20A generates an NCO signal (step ST101 in FIG. 12). The step ST101 is an exemplary step of generating a synchronizing purpose signal.

Subsequently, the GPS apparatus 32 receives NCO information 160 (see FIG. 9) (step ST102).

The GPS apparatus 32 generates synthesizer correcting information 172 (step ST103).

The GPS apparatus 32 corrects the frequency error of the synthesizer 32b (step ST104).

The GPS apparatus 32 then performs steps ST105 to ST110. Note that these steps are the same as the aforementioned steps ST4 to ST9 (see FIG. 7) and thus the description thereof is omitted here.

By the aforementioned steps, without correcting the frequency error of the positioning side reference clock, it is possible to further reduce the time required for the terminal 20A to receive the signals S1, etc., from the GPS satellites 12a, etc.

Program, Computer Readable Storage Medium, and the Like

A control program for a terminal apparatus can be implemented which allows a computer to perform the steps of generating a synchronizing purpose signal, obtaining correcting information, generating frequency error information, generating estimated receiving frequency information, generating search frequency range information, receiving a satellite signal, and the like, of the aforementioned exemplary operation.

In addition, a computer readable storage medium having stored therein such a control program for a terminal apparatus, and the like can also be implemented.

A program storage medium used to install such a control program for a terminal apparatus and the like on a computer and allow the computer to execute the program and the like may be realized not only by, for example, package media such as a flexible disk such as a floppy (registered trademark), a CD-ROM (Compact Disc Read Only Memory), a CD-R (Compact Disc-Recordable), a CD-RW (Compact Disc-Rewritable), and a DVD (Digital Versatile Disc) but also by a semiconductor memory, a magnetic disk, a magneto-optical disk, and the like, in which the program can be temporarily or permanently stored.

The present invention is not limited to the above-described respective embodiments. Further, the above-described respective embodiments may be combined with each other.

What is claimed is:

1. A terminal apparatus comprising:
   a communication apparatus that communicates with a communication base station using a communication signal at a predetermined frequency; and
   a GPS apparatus,
   wherein the communication apparatus includes
      a first oscillator that generates a constant reference signal used to receive the communication signal at the predetermined frequency,
      an RF section that receives the communication signal using the reference signal, and outputs a base band signal of the communication signal,
      a second oscillator that generates a synchronizing purpose signal used to achieve synchronization with the base band signal outputted from the RF section while changing a frequency of the synchronizing purpose signal according to a given setting parameter,
      a correcting section that corrects the setting parameter so that a frequency of the base band signal coincides with the frequency of the synchronizing purpose signal, and
      a base band processing section that achieves synchronization with the base band signal using the synchronizing purpose signal to reproduce a signal,
   wherein the GPS apparatus includes
      a positioning side reference signal generating section that generates, based on the reference signal, a positioning side reference signal that is reference for an operation of the GPS apparatus,
      an error calculating section that calculates a frequency error of the reference signal using the setting parameter,
      a receiving frequency estimating section that estimates a receiving frequency when receiving a satellite signal that is a signal from a positioning satellite,
      a frequency range calculating section that calculates a frequency range used to search for the satellite signal based on the estimated receiving frequency and the frequency error of the reference signal, and
      a satellite signal receiving section that receives the satellite signal by searching for the frequency range using the positioning side reference signal.

2. A control method for a terminal apparatus that includes a communication apparatus that communicates with a communication base station using a communication signal at a predetermined frequency and a GPS apparatus, the method comprising:
   causing the communication apparatus to generate a constant reference signal used to receive the communication signal at the predetermined frequency;

causing the communication apparatus to receive the communication signal using the reference signal, and extract a base band signal of the communication signal;

causing the communication apparatus to generate a synchronizing purpose signal used to achieve synchronization with the base band signal while changing a frequency of the synchronizing purpose signal according to a given setting parameter;

causing the communication apparatus to correct the setting parameter so that a frequency of the base band signal coincides with the frequency of the synchronizing purpose signal;

causing the communication apparatus to achieve synchronization with the base band signal using the synchronizing purpose signal, and reproduce a signal;

causing the GPS apparatus to generate, based on the reference signal, a positioning side reference signal that is reference for an operation of the GPS apparatus;

causing the GPS apparatus to calculate a frequency error of the reference signal using the setting parameter;

causing the GPS apparatus to estimate a receiving frequency when receiving a satellite signal that is a signal from a positioning satellite;

causing the GPS apparatus to calculate a frequency range used to search for the satellite signal based on the estimated receiving frequency and the frequency error of the reference signal; and causing the GPS apparatus to receive the satellite signal by searching for the frequency range using the positioning side reference signal.

3. A program that causes a computer included in a terminal apparatus to control the terminal apparatus, the terminal apparatus including a communication apparatus that communicates with a communication base station using a communication signal at a predetermined frequency and a GPS apparatus, the communication apparatus including a first oscillator that generates a constant reference signal used to receive the communication signal at the predetermined frequency, and an RF section that receives the communication signal using the reference signal, and outputs a base band signal of the communication signal, a second oscillator that generates a synchronizing purpose signal used to achieve synchronization with the base band signal while changing a frequency of the synchronizing purpose signal according to a given setting parameter, a correcting section that corrects the setting parameter so that a frequency of the base band signal coincides with the frequency of the synchronizing purpose signal, and a base band processing section that achieves synchronization with the base band signal using the synchronizing purpose signal to reproduce a signal, the program causing a computer to execute instructions comprising:

generating, based on the reference signal, a positioning side reference signal that is reference for an operation of the GPS apparatus;

calculating a frequency error of the reference signal using the setting parameter;

estimating a receiving frequency when receiving a satellite signal that is a signal from a positioning satellite;

calculating a frequency range used to search for the satellite signal based on the estimated receiving frequency and the frequency error of the reference signal; and receiving the satellite signal by searching for the frequency range using the positioning side reference signal.

4. A terminal apparatus comprising:

a communication apparatus that communicates with a communication base station using a communication signal at a predetermined frequency; and a GPS apparatus, wherein the communication apparatus includes a first oscillator that generates a constant reference signal used to receive the communication signal at the predetermined frequency, an RF section that receives the communication signal using the reference signal, and outputs a base band signal of the communication signal, a second oscillator that generates a synchronizing purpose signal used to achieve synchronization with the base band signal outputted from the RF section while changing a frequency of the synchronizing purpose signal according to a given setting parameter, a correcting section that corrects the setting parameter so that a frequency of the base band signal coincides with the frequency of the synchronizing purpose signal, and a base band processing section that achieves synchronization with the base band signal using the synchronizing purpose signal to reproduce a signal, wherein the GPS apparatus includes an error calculating section that calculates a frequency error of the reference signal using the setting parameter, a positioning side reference signal generating section that generates a positioning side reference signal that is reference for an operation of the GPS apparatus by correcting a frequency of the reference signal using the frequency error calculated by the error calculating section, a receiving frequency estimating section that estimates a receiving frequency when receiving a satellite signal that is a signal from a positioning satellite;

a frequency range calculating section that calculates a frequency range used to search for the satellite signal based on the estimated receiving frequency, and a satellite signal receiving section that receives the satellite signal by searching for the frequency range using the positioning side reference signal.

5. A control method for a terminal apparatus that includes a communication apparatus that communicates with a communication base station using a communication signal at a predetermined frequency and a GPS apparatus, the method comprising:

causing the communication apparatus to generate a constant reference signal used to receive the communication signal at the predetermined frequency;

causing the communication apparatus to receive the communication signal using the reference signal, and extract a base band signal of the communication signal;

causing the communication apparatus to generate a synchronizing purpose signal used to achieve synchronization with the base band signal while changing a frequency of the synchronizing purpose signal according to a given setting parameter;

causing the communication apparatus to correct the setting parameter so that a frequency of the base band signal coincides with the frequency of the synchronizing purpose signal;

causing the communication apparatus to achieve synchronization with the base band signal using the synchronizing purpose signal, and reproduce a signal; causing the positioning apparatus to calculate a frequency error of the reference signal using the setting parameter;

causing the GPS apparatus to calculate a frequency error of the reference signal using the setting parameter;

causing the GPS apparatus to generate a positioning side reference signal that is reference for an operation of the GPS apparatus by correcting a frequency of the reference signal using the frequency error;

causing the GPS apparatus to estimate a receiving frequency when receiving a satellite signal that is a signal from a positioning satellite;

causing the GPS apparatus to calculate a frequency range used to search for the satellite signal based on the estimated receiving frequency; and causing the GPS apparatus to receive the satellite signal by searching for the frequency range using the positioning side reference signal.

6. A program that causes a computer included in a terminal apparatus to control the terminal apparatus, the terminal apparatus including a communication apparatus that communicates with a communication base station using a communication signal at a predetermined frequency and a GPS apparatus, the communication apparatus including a first oscillator that generates a constant reference signal used to receive the communication signal at the predetermined frequency, an RF section that receives the communication signal using the reference signal, and outputs a base band signal of the communication signal, a second oscillator that generates a synchronizing purpose signal used to achieve synchronization with the base band signal while changing a frequency of the synchronizing purpose signal according to a given setting parameter, a correcting section that corrects the setting parameter so that a frequency of the base band signal coincides with the frequency of the synchronizing purpose signal, and a base band processing section that achieves synchronization with the base band signal using the synchronizing purpose signal to reproduce a signal, the program causing the computer to execute instructions comprising:

calculating a frequency error of the reference signal using the setting parameter;

generating a positioning side reference signal that is reference for an operation of the GPS apparatus by correcting a frequency of the reference signal using the frequency error;

estimating a receiving frequency when receiving a satellite signal that is a signal from a positioning satellite;

calculating a frequency range used to search for the satellite signal based on the estimated receiving frequency; and receiving the satellite signal by searching for the frequency range using the positioning side reference signal.

* * * * *